(12) United States Patent
Yan et al.

(10) Patent No.: US 12,469,145 B1
(45) Date of Patent: Nov. 11, 2025

(54) FINGERPRINT IMAGE PROCESSING METHOD AND DEVICE

(71) Applicant: SAMSUNG ELECTRONICS CO., LTD., Suwon-si (KR)

(72) Inventors: Xiaochun Yan, Xi'an (CN); Chunmiao Jiang, Xi'an (CN); Hanhui Li, Xi'an (CN); Huaiwen Bai, Xi'an (CN); Jiangbo Chen, Xi'an (CN); Yanjun Chen, Xi'an (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/925,914

(22) Filed: Oct. 24, 2024

(30) Foreign Application Priority Data

Sep. 6, 2024 (CN) .......................... 202411251939.5

(51) Int. Cl.
*G06T 7/168* (2017.01)
*G06T 7/13* (2017.01)
*G06V 40/12* (2022.01)

(52) U.S. Cl.
CPC ................ *G06T 7/168* (2017.01); *G06T 7/13* (2017.01); *G06V 40/1359* (2022.01); *G06V 40/1376* (2022.01)

(58) Field of Classification Search
CPC ....... G06T 7/168; G06T 7/13; G06V 40/1359; G06V 40/1376
See application file for complete search history.

(56) References Cited

U.S. PATENT DOCUMENTS

| 7,079,672 | B2 | 7/2006 | Matsumoto et al. |
| 11,055,506 | B2* | 7/2021 | Iatsun .................. G06V 10/449 |
| 11,455,817 | B2 | 9/2022 | Ryshtun et al. |

FOREIGN PATENT DOCUMENTS

| CN | 101576999 A | 11/2009 |
| CN | 103500334 A | 1/2014 |
| CN | 105659253 A | 6/2016 |

OTHER PUBLICATIONS

Yang, et al., "Efficient and Secure Fingerprint Verification for Embedded Devices", in EURASIP Journal on Applied Signal Processing, vol. 2006, Article ID 58263, DOI 10.1155/ASP/2006/58263, Jan. 21, 2006, pp. 1-11.

* cited by examiner

*Primary Examiner* — Abhishek Sarma
(74) *Attorney, Agent, or Firm* — Morgan, Lewis & Bockius LLP

(57) ABSTRACT

A fingerprint image processing method includes: receiving a plurality of blocks of a block matrix representing a fingerprint image; and processing a first set of blocks of the plurality of blocks, the processing comprising: obtaining a plurality of candidate directions of a current block, wherein the plurality of candidate directions include an initial direction of the current block, and directions of at least a respective predetermined number of blocks on a left of the current block and a right of the current block, and the initial direction is determined using a direction of a left adjacent block and a direction of an upper adjacent block of the current block; and determining a direction of the current block from among the plurality of candidate directions based on Discrete Fourier Transform (DFT) energies in the plurality of candidate directions.

20 Claims, 9 Drawing Sheets

FINGERPRINT IMAGE PROCESSING METHOD AND DEVICE

CROSS-REFERENCE TO RELATED APPLICATION

This application is based on and claims priority under 35 U.S.C. § 119 to Chinese Patent Application No. 202411251939.5, filed on Sep. 6, 2024, in the China National Intellectual Property Administration, the disclosure of which is incorporated by reference herein in its entirety.

BACKGROUND

1. Technical Field

The present disclosure relates to image processing technology, and particularly, relates to a fingerprint image processing method and a fingerprint image processing device.

2. Discussion of Related Art

Biometrics are body measurements and calculations related to human characteristics. For example, fingerprint biometrics may be used to authenticate or identify a person. Fingerprints are biological features having high security that can be used for authentication. Fingerprint recognition may depend on the extraction of fingerprint features. Minutiae are a type of common fingerprint feature. The extraction of minutiae is typically needed for the fingerprint recognition.

FIG. 1 is a fingerprint feature extraction procedure of NIST Biometric Image Software (NBIS). As for a part of the fingerprint feature extraction procedure, a fingerprint image may be divided into blocks according to a specific size, and a direction may be individually calculated for each block. Common methods for calculating the direction may include a gradient method or a Discrete Fourier Transform (DFT) method, in which the gradient method is sensitive to noise, while the DFT method may generally expand a size of a calculated block for smoothing. Thus, the accuracy of the DFT method is high.

No matter which method is used, the existing solution typically needs to repeat a calculation for each block to calculate the direction of each block separately. The overhead of such calculation may be large, and in some scenarios, a latency may be greatly increased.

SUMMARY

The present disclosure provides a fingerprint image processing method and a fingerprint image processing device for improving processing of a fingerprint image.

According to a first aspect of an exemplary embodiment of the present invention, there is provided a fingerprint image processing method, including: receiving a plurality of blocks of a block matrix representing a fingerprint image; and processing a first set of blocks of the plurality of blocks, the processing comprising: obtaining a plurality of candidate directions of a current block, wherein the plurality of candidate directions comprise an initial direction of the current block, and directions of at least a respective predetermined number of blocks on a left of the current block and a right of the current block, and the initial direction is determined using a direction of a left adjacent block of the current block and a direction of an upper adjacent block of the current block; and determining a direction of the current block from among the plurality of candidate directions using Discrete Fourier Transform (DFT) energies in the plurality of candidate directions.

In an embodiment, a fingerprint image processing method may further include determining the initial direction of the current block, wherein determining the initial direction of the current block may include: determining a first direction serial number corresponding to the direction of the left adjacent block and a second direction serial number corresponding to the direction of the upper adjacent block; and determining the initial direction of the current block using the first direction serial number and the second direction serial number.

In an embodiment, the determining the initial direction of the current block using the first direction serial number and the second direction serial number may include: in a case where an absolute value of a difference between the first direction serial number and the second direction serial number is less than or equal to a predetermined threshold, obtaining a first average value of the first direction serial number and the second direction serial number, and taking a direction corresponding to the first average value as the initial direction of the current block; and in a case where the absolute value of the difference between the first direction serial number and the second direction serial number is greater than the predetermined threshold, adding a small direction serial number and a total direction serial number to obtain an adjusted direction serial number, obtaining a second average value of the adjusted direction serial number and a large direction serial number, and taking a direction corresponding to the second average value as the initial direction of the current block, wherein the small direction serial number is a smaller direction serial number in the first direction serial number and the second direction serial number, and the large direction serial number is a larger direction serial number in the first direction serial number and the second direction serial number.

In an embodiment, a fingerprint image processing method may further include processing each of the plurality of candidate directions before the determining the direction of the current block from among the plurality of candidate directions using the DFT energies in the plurality of candidate directions, wherein processing each of the plurality of candidate directions may include: performing pixel row addition processing on blocks in a current candidate direction to obtain a pixel sum corresponding to the current candidate direction; performing multiplication on pixel sums corresponding to the plurality of candidate directions and trigonometric functions of a plurality of frequencies to obtain energy combinations respectively corresponding to the plurality of frequencies; and taking the energy combinations respectively corresponding to the plurality of frequencies as the DFT energies.

In an embodiment, the determining the direction of the current block from among the plurality of candidate directions based on the DFT energies in the plurality of candidate directions may include: obtaining a maximum value in each energy combination and a ratio of the maximum value to an average value of the corresponding energy combination; determining a unique predetermined energy combination among all the energy combinations, wherein the predetermined energy combination satisfies a predetermined condition, and the predetermined condition evaluates that a maximum value of an energy combination is greater than a first threshold and a ratio corresponding to the energy combination is greater than a second threshold; and taking a candidate direction corresponding to a maximum value in the predetermined combination as the direction of the current block.

In an embodiment, in a case where the energy combinations do not satisfy the predetermined condition, calculating the direction of the current block may use a primal method.

In an embodiment, the determining the direction of the current block from among the plurality of candidate directions based on the DFT energies in the plurality of candidate directions may include: obtaining a maximum value of each energy combination; sorting the energy combinations in order of maximum value from large to small; and processing, sequentially, the sorted energy combinations, wherein processing the sorted energy combinations may include: obtaining a ratio of a maximum value of a current energy combination to an average value of the current energy combination; in a case where the current energy combination satisfies a predetermined condition, stopping processing subsequent energy combinations, and taking a candidate direction corresponding to the maximum value of the current energy combination as the direction of the current block, wherein the predetermined condition evaluates that a maximum value of an energy combination is greater than a first threshold and a ratio corresponding to the energy combination is greater than a second threshold; in a case where the maximum value of the current energy combination is less than or equal to the first threshold, stopping the processing of the sorted energy combinations; and in a case where the maximum value of the current energy combination is greater than the first threshold and the ratio corresponding to the current energy combination is less than the second threshold, continuing to process a next energy combination in the sorted energy combinations.

In an embodiment, in a case where the energy combinations do not satisfy the predetermined condition, calculating the direction of the current block may use a primal method.

In an embodiment, a fingerprint image processing method may further include processing a second set of blocks of the plurality of blocks using a primal method to calculate directions of the second set of blocks, wherein the second set of blocks are disposed in at least one of an edge row or an edge column of the block matrix.

According to a first aspect of an exemplary embodiment of the present invention, there is provided a fingerprint image processing method, including: dividing a fingerprint image to obtain a block matrix including a plurality of blocks; for each block in the block matrix except a first row and a first column, performing following processing: obtaining a plurality of candidate directions of a current block, wherein the plurality of candidate directions include an initial direction of the current block, and directions of respective predetermined number of blocks on a left of the current block and a right of the current block, and the initial direction is determined based on a direction of a left adjacent block of the current block and a direction an upper adjacent block of the current block; and determining a direction of the current block from among the plurality of candidate directions using Discrete Fourier Transform (DFT) energies in the plurality of candidate directions.

In an embodiment, a fingerprint image processing method may include determining the initial direction of the current block, wherein determining the initial direction of the current block may include: determining a first direction serial number corresponding to the direction of the left adjacent block and a second direction serial number corresponding to the direction of the upper adjacent block; and determining the initial direction of the current block using the first direction serial number and the second direction serial number.

In an embodiment, the determining the initial direction of the current block using the first direction serial number and the second direction serial number includes: in a case where an absolute value of a difference between the first direction serial number and the second direction serial number is less than or equal to a predetermined threshold, obtaining a first average value of the first direction serial number and the second direction serial number, and taking a direction corresponding to the first average value as the initial direction of the current block; and in a case where the absolute value of the difference between the first direction serial number and the second direction serial number is greater than the predetermined threshold, adding a small direction serial number and a total direction serial number to obtain an adjusted direction serial number, obtaining a second average value of the adjusted direction serial number and a large direction serial number, and taking a direction corresponding to the second average value as the initial direction of the current block, wherein the small direction serial number is a smaller direction serial number in the first direction serial number and the second direction serial number, and the large direction serial number is a larger direction serial number in the first direction serial number and the second direction serial number.

In an embodiment, a fingerprint image processing method further include: processing each of the plurality of candidate directions before the determining the direction of the current block from among the plurality of candidate directions using the DFT energies in the plurality of candidate directions, wherein processing each of the plurality of candidate directions may include: performing pixel row addition processing on blocks in a current candidate direction to obtain a pixel sum corresponding to the current candidate direction; performing multiplication on pixel sums corresponding to the plurality of candidate directions and trigonometric functions of a plurality of frequencies to obtain energy combinations respectively corresponding to the plurality of frequencies; and taking the energy combinations respectively corresponding to the plurality of frequencies as the DFT energies.

In an embodiment, the determining the direction of the current block from among the plurality of candidate directions based on the DFT energies in the plurality of candidate directions includes: obtaining a maximum value in each energy combination and a ratio of the maximum value to an average value of the corresponding energy combination; determining a unique predetermined energy combination among all the energy combinations, wherein the predetermined energy combination satisfies a predetermined condition, and the predetermined condition evaluates that a maximum value of an energy combination is greater than a first threshold and a ratio corresponding to the energy combination is greater than a second threshold; and taking a candidate direction corresponding to a maximum value in the predetermined combination as the direction of the current block.

In an embodiment, in a case where the energy combinations do not satisfy the predetermined condition, calculating the direction of the current block may be performed by using a primal method.

In an embodiment, the determining the direction of the current block from among the plurality of candidate directions based on the DFT energies in the plurality of candidate directions further includes: obtaining a maximum value of each energy combination; sorting all the energy combinations in order of maximum value from large to small; and processing, sequentially, the sorted energy combinations, wherein processing the sorted energy combinations may include: obtaining a ratio of a maximum value of a current energy combination to an average value of the current energy combination; in a case where the current energy combination satisfies a predetermined condition, stopping processing subsequent energy combinations, and taking a candidate direction corresponding to the maximum value of the current energy combination as the direction of the current block, wherein the predetermined condition evaluates that a maximum value of an energy combination is greater than a first threshold and a ratio corresponding to the energy combination is greater than a second threshold; in a case where the maximum value of the current energy combination is less than or equal to the first threshold, stopping the processing of the sorted energy combinations; and in a case where the maximum value of the current energy combination is greater than the first threshold and the ratio corresponding to the current energy combination is less than the second threshold, continuing to process a next energy combination in the sorted energy combinations.

In an embodiment, in a case where the energy combinations do not satisfy the predetermined condition, the direction of the current block is calculated by using a primal method.

In an embodiment, after dividing the fingerprint image to obtain the block matrix including the plurality of blocks, the fingerprint image processing method includes: using a primal method to calculate directions of blocks in the first row and the first column of the block matrix.

According to an exemplary embodiment of the present disclosure, there is provided a fingerprint image processing device, including: a dividing unit configured to divide a fingerprint image to obtain a block matrix including a plurality of blocks; and a direction determining unit configured to process each block in the block matrix except a first row and a first column, by: obtaining a plurality of candidate directions of a current block, wherein the plurality of candidate directions include an initial direction of the current block, and directions of respective predetermined number of blocks on left and right of the current block, and the initial direction is determined based on directions of a left adjacent block and an upper adjacent block of the current block; and determining a direction of the current block from among the plurality of candidate directions based on Discrete Fourier Transform (DFT) energies in the plurality of candidate directions.

According to an exemplary embodiment of the present disclosure, a fingerprint image processing device may include a processor; and a computer readable storage medium stored therein with a computer program, wherein when the computer program is performed by the processor, implements a method of the direction determining unit.

By using the technical solution of the present disclosure, a fingerprint image processing method and device may be provided. While calculating the initial direction of the current block, the present disclosure considers the directions of adjacent blocks (e.g., the left adjacent block and the upper adjacent block), thereby increasing the accuracy of the direction of the current block. Improvements in accuracy may be more apparent in an area with relatively large changes in direction. Moreover, the present disclosure may perform verification within a small range (e.g., the respective predetermined number of blocks on the left and right of the current block) around the current block to determine a final direction of the current block, so that it may be unnecessary to traverse the directions of all blocks, which may reduce a calculation time of the blocks, and the calculation time of a full fingerprint image may be reduced.

Other aspects and/or advantages of the general concept of the present disclosure will be partially illustrated in the subsequent depictions, and the other part will become clear through the depiction or may be learned through the implementation of the general concept of the present disclosure.

BRIEF DESCRIPTION OF THE DRAWINGS

The above and other objects and features of an exemplary embodiments of the present disclosure will become clearer through the following description taken in conjunction with the accompanying drawings exemplarily illustrating embodiments in which.

DETAILED DESCRIPTION

The following detailed description is provided to assist the reader in gaining a comprehensive understanding of the methods, apparatuses, and/or systems described herein. However, various changes, modifications and equivalents of the methods, apparatuses and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. In addition, descriptions of features known in the art can be omitted for increased clarity and conciseness.

The features described herein can be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms (including technical and scientific terms) used herein have the same meaning as commonly understood by one of ordinarily skilled in the art to which the present disclosure belongs. Terms, such as those defined in commonly used dictionaries, should be interpreted as having a meaning that is consistent with their meaning in the context of the relevant art, and will not to be interpreted in an idealized or overly formal sense, unless expressly so defined herein.

In addition, in the description of the examples, when it is considered that the detailed description of the well-known related structure or function will cause a vague interpretation of the present disclosure, such detailed description will be omitted.

Figure 1:
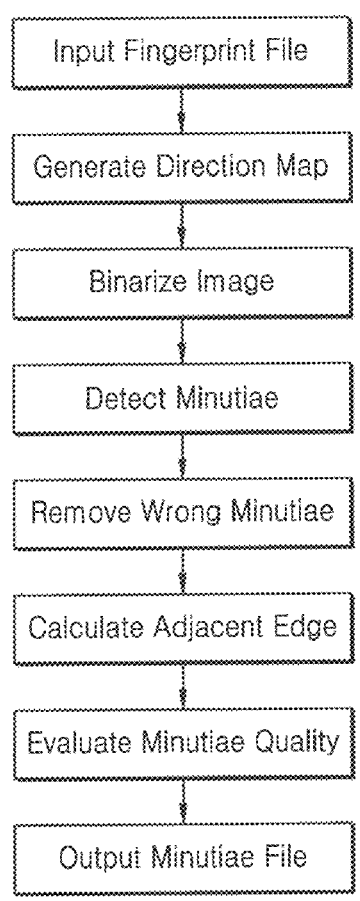
FIG. 1 is schematic diagram of a fingerprint feature extraction procedure of NBIS in the related technology.
Figure 2:
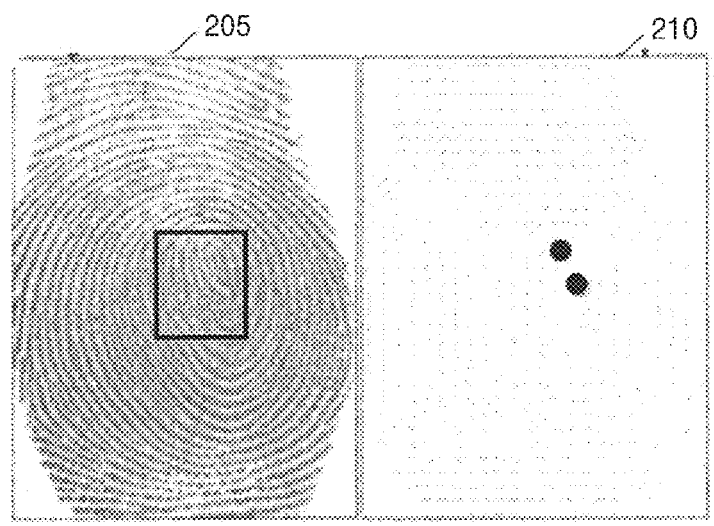
FIG. 2 is a fingerprint image and a direction map corresponding thereto according to an exemplary embodiment of the present disclosure.

FIG. 2 shows a fingerprint image 205 and a direction map 210 corresponding thereto, in which a direction of a ridge within a block may be denoted by a line. The direction map 210 may be an orientation field or ridge flow map including a plurality of lines, each line corresponding to a respective point. A fingerprint direction of a block may be similar to fingerprint directions of surrounding blocks in most areas due to continuity of fingerprints, thus, directions of uncalculated blocks may be inferred according to directions of the calculated blocks. According to the above principle, a direction of a current block may be inferred by using directions of blocks surrounding the current block, and a verification may be performed within a small range around the inferred direction of the current block to determine a final direction of the current block. If a final direction of the current block cannot be determined, a primal method (including but not limited to an NBIS method) may be used to recalculate the direction of the current block. In a case that a primal method is used for certain blocks, a total calculation time for the current block may be increased, but a total calculation time of the blocks may be reduced, since only the calculation time of a small number of blocks may be increased. In an embodiment, the calculation time of the full image may be reduced and a latency may be reduced.

Figure 3:
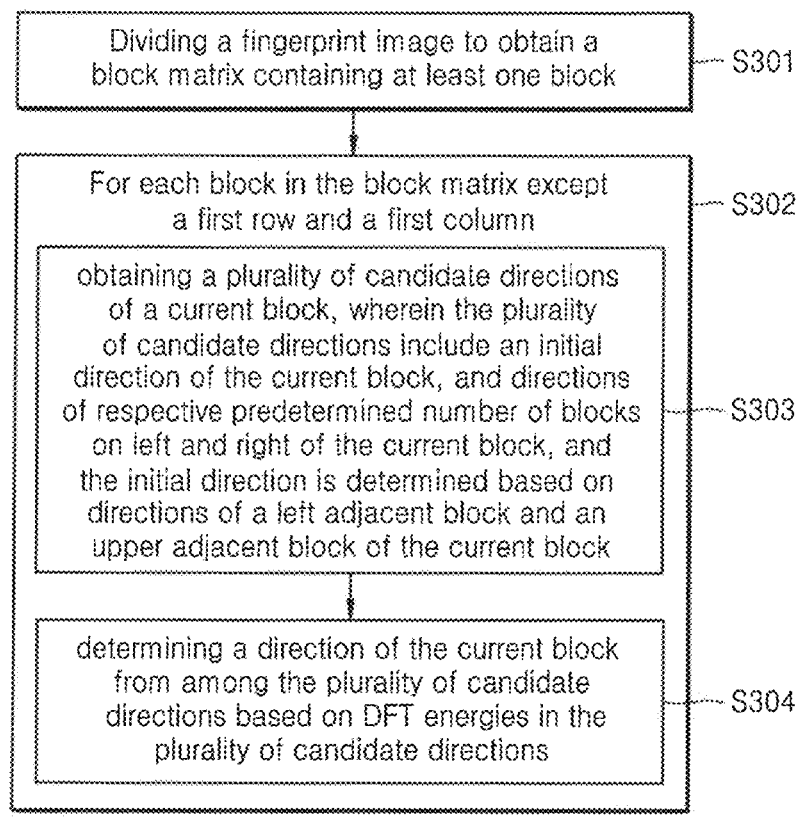
FIG. 3 is a flowchart of a fingerprint image processing method according to an exemplary embodiment of the present disclosure.

According to an aspect of an exemplary embodiment of the present disclosure, a fingerprint image processing method may be provided. FIG. 3 is a flowchart of a fingerprint image processing method according to an exemplary embodiment of the present disclosure. Referring to FIG. 3, a fingerprint image processing method may include the following steps:

At step S301, a fingerprint image may be divided to obtain a block matrix containing at least one block.

As an example, the fingerprint image may be divided according to a predetermined size to obtain a plurality of blocks. A set of divided blocks may be regarded as a block matrix, in which the divided blocks may be arranged according to initial positions. The predetermined size may be set as needed, and present disclosure does not impose any limitation thereon.

At step S302, each block in the block matrix, except for blocks in at least one of a first row or a first column, may be processed. The blocks not disposed in the first row or the first column may be a first set of blocks. It should be understood that the first row and the first column may be edges (e.g., a first edge row and a first edge column) of the block matrix. The blocks disposed in the first row or the first column may be a second set of blocks. The first set of blocks and the second set of blocks may be processed differently. Further, blocks of a second edge row (e.g., a last row) and a second edge column (e.g., a last column) may be blocks among the first set of blocks.

At step S303, a plurality of candidate directions of a current block may be obtained, wherein the plurality of candidate directions include an initial direction of the current block, and directions of a predetermined number of blocks on a left of the current block and a right of the current block, and the initial direction is determined based on directions of a left adjacent block and an upper adjacent block of the current block. At step S304, a direction of the current block may be determined from among the plurality of candidate directions based on Discrete Fourier Transform (DFT) energies in the plurality of candidate directions.

The predetermined number may be set as needed, for example, the predetermined number may be set to 2, however, the present disclosure does not impose any limitation thereon. For example, the predetermined number of blocks may be set to 1 or 3 blocks.

As an example, using the predetermined number being 2, the initial direction of the current block may be determined based on the directions of the left adjacent block and the upper adjacent block of the current block. After the initial direction of the current block is determined, directions of two blocks on the left of the current block and two blocks on right of the current block may also be obtained, so that a total of five candidate directions may be obtained, and the direction of the current block may be determined from among the five candidate directions based on the DFT energies of respective five candidate directions.

In an embodiment, the predetermined number of blocks may be a maximum number of blocks used in determining the direction of the current block. For example, for a current block in a second column of the block matrix, only one block to the left of the current block may be available. In this case, directions of one block on the left of the current block and two blocks on right of the current block may also be obtained, so that a total of four candidate directions may be obtained, and the direction of the current block may be determined from among the four candidate directions based on the DFT energies of respective four candidate directions.

Figure 4:
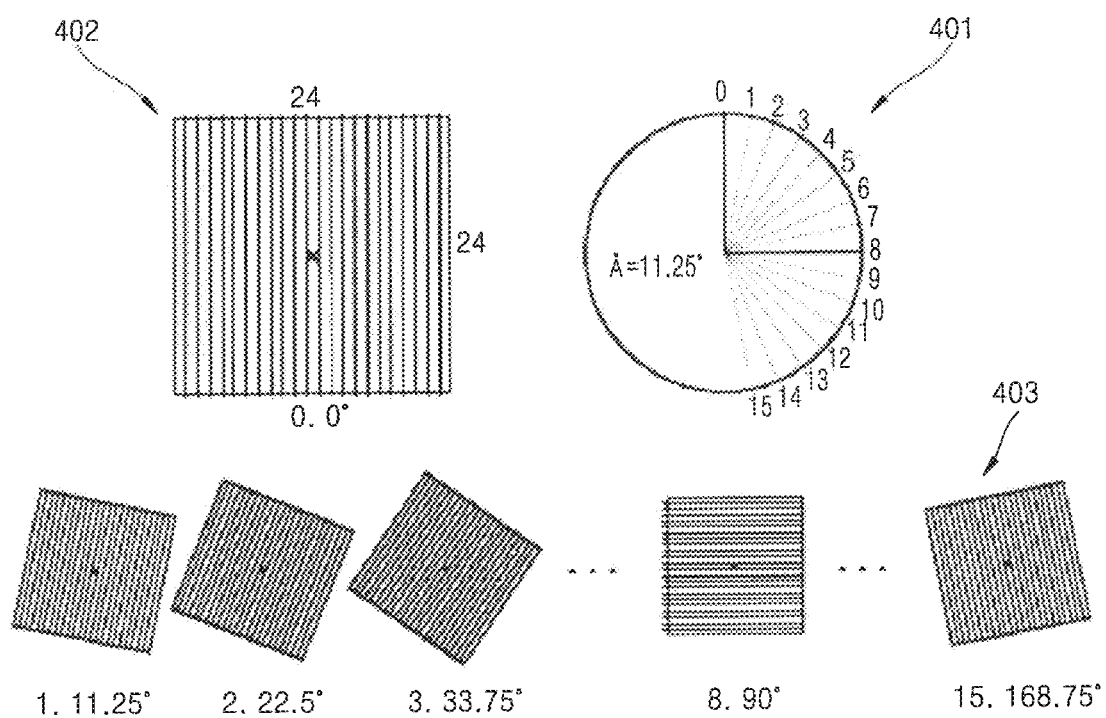
FIG. 4 is a schematic diagram of an image rotation in a DFT method according to an exemplary embodiment of the present disclosure.

Certain aspects of the present application will be described in the context of serialized directions. For example, while determining a direction of a block, a DFT method may rotate a block, sum pixels of each row of the rotated block, obtain DFT energies using different frequencies, and determine a direction corresponding to a maximum DFT energy as a final direction of the block. FIG. 4 shows a schematic diagram illustrating an image rotation in a DFT method. As illustrated in FIG. 4, an angular space 401 of 180° may be equally divided into 16 directions (e.g., 0, 1, 2, ..., 15), and the block 402 may be rotated 15 times (see 403) to correspond to each of the directions (for example, assuming an initial state at direction θ). A serial number, e.g., 1-15, may correspond to each direction (e.g., serial number 15 corresponds to direction 168.75 degrees), and the serial number may be a natural number starting from 1, so that a final direction of each block may correspond to a serial number. It should be understood that 16 directions is an example, and other numbers of directions may be used. For example, the angular space of 180° may be equally divided into 32 directions, which may be set according to a practical situation. The present disclosure does not impose any limitation thereon.

In an embodiment of the present disclosure, the initial direction of the current block may be determined by determining a first direction serial number corresponding to the direction of the left adjacent block and a second direction serial number corresponding to the direction of the upper adjacent block, and determining the initial direction of the current block based on the first direction serial number and the second direction serial number. Through an embodiment, the direction of the current block may be determined conveniently and rapidly according to the direction serial numbers corresponding to the directions of the respective left adjacent block and upper adjacent block.

As an example, the first direction serial number corresponding to the direction of the left adjacent block and the second direction serial number corresponding to the direction of the upper adjacent block may be determined, and the initial direction of the current block may be determined based on the first direction serial number and the second direction serial number. For example, an average value of the first direction serial number and the second direction serial number may be obtained, and a direction corresponding to the average value may be taken as the initial direction of the current block. Other methods may also be used, and the present disclosure does not impose any limitation thereon.

In an embodiment of the present disclosure, an operation of determining the initial direction of the current block may be based on the first direction serial number and the second direction serial number. For example, in a case where an absolute value of a difference between the first direction serial number and the second direction serial number is less than or equal to a predetermined threshold, an average value of the first direction serial number and the second direction serial number may be obtained, and a direction corresponding to the average value may be taken as the initial direction of the current block. In another example, in a case where the absolute value of the difference between the first direction serial number and the second direction serial number is greater than the predetermined threshold, a small direction serial number and a total direction serial number may be added to obtain an adjusted direction serial number, an average value of the adjusted direction serial number and a large direction serial number may be obtained, and a direction corresponding to the average value may be taken as the initial direction of the current block, wherein the small direction serial number is a smaller direction serial number among the first direction serial number and the second direction serial number, and the large direction serial number is a larger direction serial number among the first direction serial number and the second direction serial number. Through an embodiment, according to a difference relationship of the direction serial numbers corresponding to the directions of the respective left adjacent block and upper adjacent block, whether the average value or a special processing is used is to determine the initial direction may be evaluated, so that the determined initial direction may be relatively accurate.

The predetermined threshold may be set as needed, for example, in a case where the total direction serial number is 32, that is, the angular space may be equally divided into 32 directions, and the predetermined threshold may be set to 10.

As described herein, the predetermined threshold may be set as needed, and for example, may be set to 9 or 11. The present disclosure does not impose any limitation thereon.

As an example, taking the total direction serial number being 32 and the predetermined threshold being 10 as an example, if the absolute value of the difference between the first direction serial number and the second direction serial number is less than or equal to 10, the average value of the first direction serial number and the second direction serial number may be obtained, and the direction corresponding to the average value may be taken as the initial direction of the current block. For example, assuming that the first direction serial number is 6 and the second direction serial number is 12, the absolute value of the difference therebetween is 6, and the initial direction of the current block may be determined as $(6+12)\div2=9$. If the absolute value of the difference between the first direction serial number and the second direction serial number is greater than 10, the small direction serial number and the total direction serial number may be added to obtain the adjusted direction serial number, the average value of the adjusted direction serial number and the large direction serial number may be obtained, and the direction corresponding to the average value may be taken as the initial direction of the current block. In an example where the first direction serial number is 6, the second direction serial number is 18, and an absolute value of the difference therebetween is 12, the initial direction of the current block may be determined as $(6+32+12)\div2=25$.

It should be understood that if the obtained average value is not an integer, the obtained average value may be rounded to obtain an integer, however, the present disclosure does not impose any limitation thereon. For example, an integer value may be obtained by rounding to even, rounding to floor, or rounding to ceiling methods.

In an embodiment of the present disclosure, before determining the direction of the current block from among the plurality of candidate directions based on the DFT energies in the plurality of candidate directions, the following processing may further be performed on each of the plurality of candidate directions. For example, pixel row addition processing may be performed on a block in a current candidate direction to obtain a pixel sum corresponding to the current candidate direction, multiplication on pixel sums corresponding to the plurality of candidate directions and trigonometric functions of a plurality of frequencies may be performed to obtain energy combinations respectively corresponding to the plurality of frequencies, and the energy combinations respectively corresponding to the plurality of frequencies may be taken as the DFT energies. Through an embodiment, the DFT energies may be quickly calculated.

The plurality of frequencies may be set as needed, for example, four frequencies may be selected, or five frequencies or three frequencies may also be selected, and the present disclosure does not impose any limitation. According to an embodiment, a selection of four frequencies may ensure a small calculation overhead on the basis that information covered by the obtained energy combinations is complete.

As an example, taking the plurality of frequencies being four frequencies (fn) and the number of the candidate directions being five, for each of five candidate directions, the row addition processing may be performed on a block in a current candidate direction to obtain a pixel sum $C_i$ corresponding to the current candidate direction, and the pixel sums $C_i$ of respective five candidate directions may be obtained. A multiplication may be performed on the pixel sums in five candidate directions and trigonometric functions of four frequencies to obtain energy combinations respectively corresponding to four frequencies. For example, for each of four frequencies, an example equation for obtaining energies Pn corresponding to five candidate directions may be written as:

$$Pn = (Ci \times sinfn)^2 + (Ci \times cosfn)_2 \tag{1}$$

where fn denotes a frequency, values of n are 1, 2, 3 and 4, Ci denotes the pixel sum, and values of i are 1, 2, 3, 4 and 5. After energies Pn corresponding to five candidate directions at each frequency may be obtained, five energies belonging to one frequency may be formed to be an energy combination. That is, an energy combination corresponds to each of four frequencies. Further, DFT energies in five candidate directions may be obtained based on the energy combinations respectively corresponding to four frequencies. For example, the four energy combinations may be regarded as the DFT energies in five candidate directions.

In an embodiment of the present disclosure, the operation of determining the direction of the current block from among the plurality of candidate directions based on the DFT energies in the plurality of candidate directions includes: obtaining a maximum value in each energy combination and a ratio of the maximum value to an average value of the corresponding energy combination; determining a unique predetermined energy combination among all the energy combinations, wherein the predetermined energy combination satisfies a predetermined condition, and the predetermined condition is that a maximum value of an energy combination is greater than a first threshold and a ratio corresponding to the energy combination is greater than a second threshold; and taking a candidate direction corresponding to a maximum value in the predetermined combination as the direction of the current block. Through an embodiment, when determining the direction of the current block, not only the maximum energy value of the energy combination is considered, but also the ratio of the maximum energy value to the average value of the energy combination is considered, so that the determined direction is more accurate.

The first threshold and the second threshold may be set as needed, and the present disclosure does not impose any limitation. It should be understood that the maximum value may be a fixed value, the ratio represents a concentration ratio and is a relative value, and in some energy combinations, the maximum energy value may be relatively small, and the energy may be relatively concentrated. The predetermined energy combination may be determined through both of the maximum energy value and the corresponding ratio. As such, even if the maximum energy value of the determined predetermined energy combination is not the maximum energy value in four energy combinations, the maximum energy value of the determined predetermined energy combination is the energy in the direction closest to the current block. In this case, the direction of the current block determined based on the maximum value in the predetermined energy combination may be more accurate.

As an example, the maximum value in each energy combination and the ratio of the maximum value to the average value of the corresponding energy combination may be obtained. The maximum value of each energy combination may be evaluated to determine if they are greater than the first threshold. The ratio corresponding to each energy combination may be evaluated to determine if they are greater than the second threshold. If the maximum value of an energy combination of the energy combinations is greater than the first threshold, and the ratio corresponding to the energy combination is also greater than the second threshold, this means that the energy combination is the predetermined energy combination, the corresponding candidate direction may be found through the maximum value in the predetermined energy combination, and the found corresponding candidate direction may be taken as the direction of the current block.

In another embodiment of the present disclosure, the operation of determining the direction of the current block from among the plurality of candidate directions based on the DFT energies in the plurality of candidate directions may include obtaining a maximum value in each energy combination, sorting all the energy combinations in order of maximum value from large to small, and sequentially processing the sorted energy combinations. The processing of a sorted energy combination may include obtaining a ratio of a maximum value of a current energy combination to an average value of the current energy combination. In a case where the current energy combination satisfies a predetermined condition, a processing of subsequent energy combinations may be stopped, and a candidate direction corresponding to the maximum value in the current energy combination may be taken as the direction of the current block, wherein the predetermined condition is that a maximum value of an energy combination is greater than a first threshold and a ratio corresponding to the energy combination is greater than a second threshold. In a case where the maximum value of the current energy combination is less than or equal to the first threshold, stopping processing subsequent energy combinations, and in a case where the maximum value of the current energy combination is greater than the first threshold and the ratio corresponding to the current energy combination is less than the second threshold, a next energy combination of the sorted energy combinations may be processed. Through an embodiment, when determining the direction of the current block, the energy combinations may be sorted by the maximum value, so that during the subsequent determination, a top energy combination may be preferably determined. If the first energy combination does not conform to the predetermined condition, the subsequent energy combinations may be less likely to conform to the predetermined condition. The determining operation may be adaptively performed so as to reduce processing time.

The first threshold and the second threshold may be set as needed, and the present disclosure does not impose any limitation thereon. It should be understood that the maximum value may be a fixed value, and the ratio represents a concentration ratio and may be a relative value. In some energy combinations, the maximum energy value may be relatively small and the energy may be concentrated. The predetermined energy combination may be determined through both of the maximum energy value and the corresponding ratio, as such, even if the maximum energy value of the determined predetermined energy combination is not the maximum energy value in four energy combinations, it is the energy in the direction closest to the current block. That is, the direction of the current block determined based on the maximum value in the predetermined energy combination may be more accurate.

As an example, the maximum value in each energy combination may be obtained, and all the energy combinations may be sorted in order of maximum value from large to small. Given the sorted energy combinations (from large to small), the first energy combination may be processed first, that is, the maximum value of the first energy combination and the corresponding ratio may be obtained. In a case where the maximum value of the first energy combination is greater than the first threshold and the corresponding ratio is greater than the second threshold, the candidate direction corresponding to the maximum value in the first energy combination may be taken as the direction of the current block. At this time, the processing on the subsequent energy combinations may be stopped, and the processing time may be reduced. That is, unneeded processing of energy combinations may be avoided. In a case where the maximum value of the first energy combination is less than or equal to the first threshold, the processing on subsequent energy combinations may be stopped. For example, if the first energy combination does not conform to the predetermined condition, the subsequent energy combinations may be less likely to conform to the condition. In a case where the maximum value of the first energy combination is greater than the first threshold and the corresponding ratio is less than or equal to the second threshold, the first energy combination may not be used to determine the direction of the current block. At this time, the processing may continue and the next energy combination may be processed. An example processing procedure is described above, and a repetitive description thereof may be omitted.

In an embodiment of the present disclosure, in a case where all the energy combinations do not satisfy the predetermined condition, the direction of the current block may be calculated by using an NBIS method. Through an embodiment, when the direction of the current block is not obtained by using a DFT method according to an embodiment, a primal method (e.g., an NBIS method) may be used to calculate the direction of the current block, thereby ensuring the accuracy of the calculation. The primal method may infer a direction for a current block. The primal method may not be used generally, since if there is an error in the inference of the direction of the previous blocks or the direction is not inferred, the error may be accumulated, and over time the inferred directions of the subsequent blocks will be subject to the accumulated error, which may inhibit or prevent correct inferences.

Figure 5:
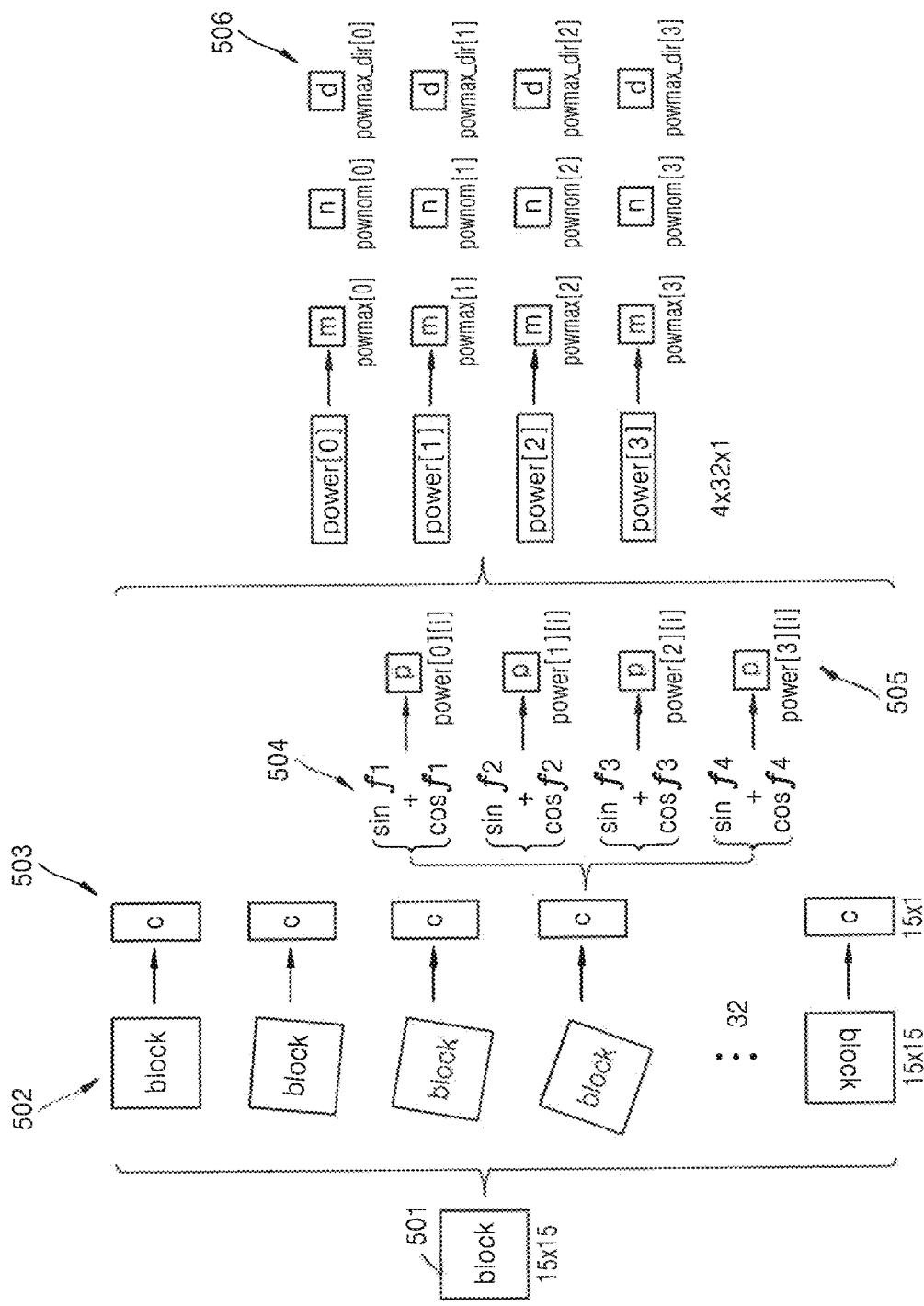
FIG. 5 is a schematic diagram illustrating a procedure of obtaining a direction of a current block of the DFT method according to an exemplary embodiment of the present disclosure.

As an example, taking a total direction serial number of 32 and using a DTF method in an NBIS method as an example, FIG. 5 shows an example procedure of obtaining a direction of a current block by a DFT method. As illustrated in FIG. 5, the current block 501 may be rotated 502, pixel rows 503 may be added to the rotated blocks, and the result after addition may be multiplied by trigonometric function waves of four different frequencies 504 (e.g., using equation (1)) to obtain an energy distribution curve 505. A direction 506 corresponding to a direction serial number with the largest energy may be found in four energy distribution curves to be taken as a final direction of the current block.

Figure 6:
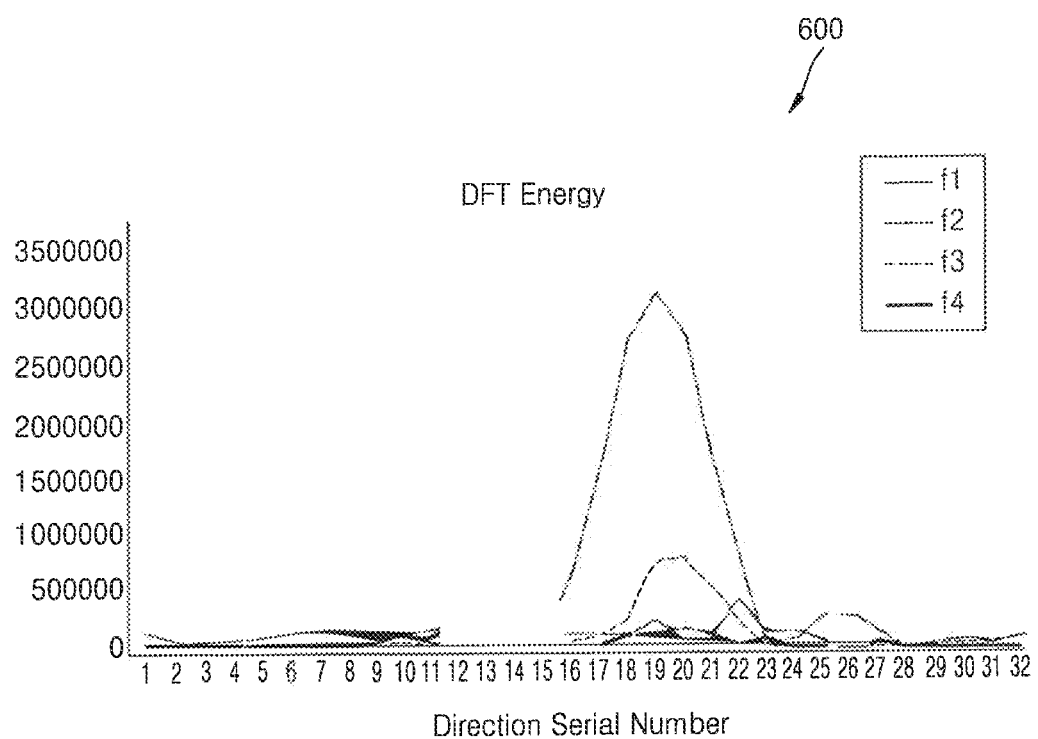
FIG. 6 is an energy graph for 4 frequencies of a current block according to an exemplary embodiment of the present disclosure.
Figure 7:
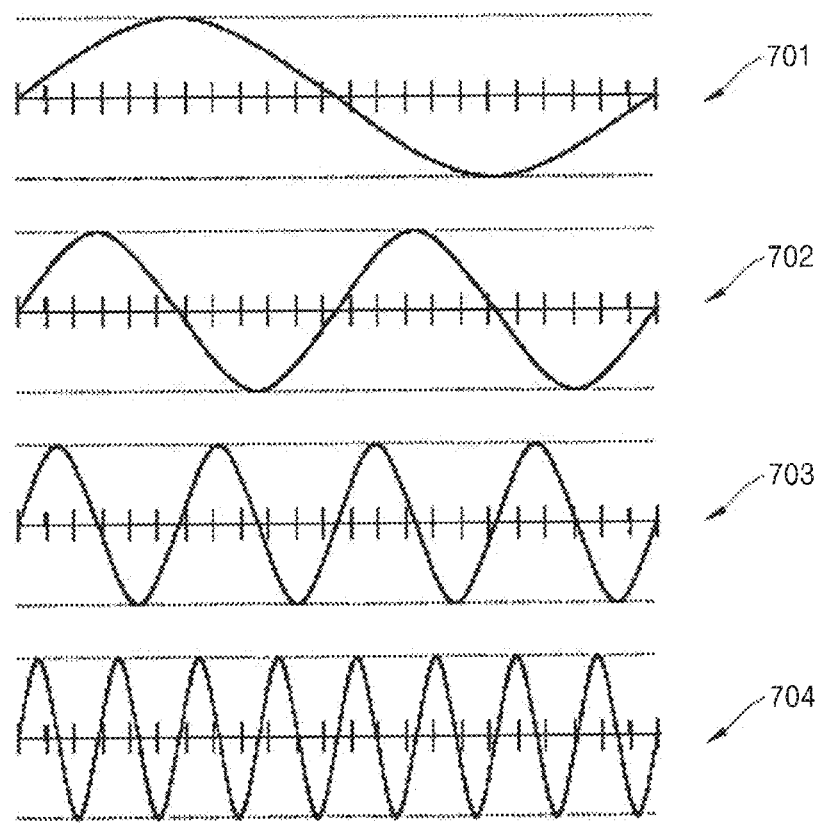
FIG. 7 is a schematic diagram illustrating four frequency waves used in the DFT method according to an exemplary embodiment of the present disclosure.

FIG. 6 shows an energy graph 600 for four frequencies of the current block. FIG. 7 shows four frequency waves (701-704) that may be used. It may be seen from FIG. 6 that a maximum value may be finally taken from the energy of f2, the corresponding direction serial number is 19 (on the x axis), and the direction corresponding to the direction serial number may be the final direction of the current block.

In an embodiment of the present disclosure, after the fingerprint image is divided to obtain the block matrix containing at least one block, an NBIS method may be further used to calculate a direction of a block on at least one of a first row or a first column of the block matrix. Through an embodiment, using a primal method (e.g., an NBIS method) to calculate the direction of the block on the first row and the first column of the block matrix may support or ensure smooth progress of a method according to an embodiment of the present disclosure, where the image processing may be performed from the left to the right of the image, and from the top to the bottom of the image. It should be understood that the directions of the left block and the upper block of the current block have been calculated according to an embodiment of the present invention.

Figure 8:
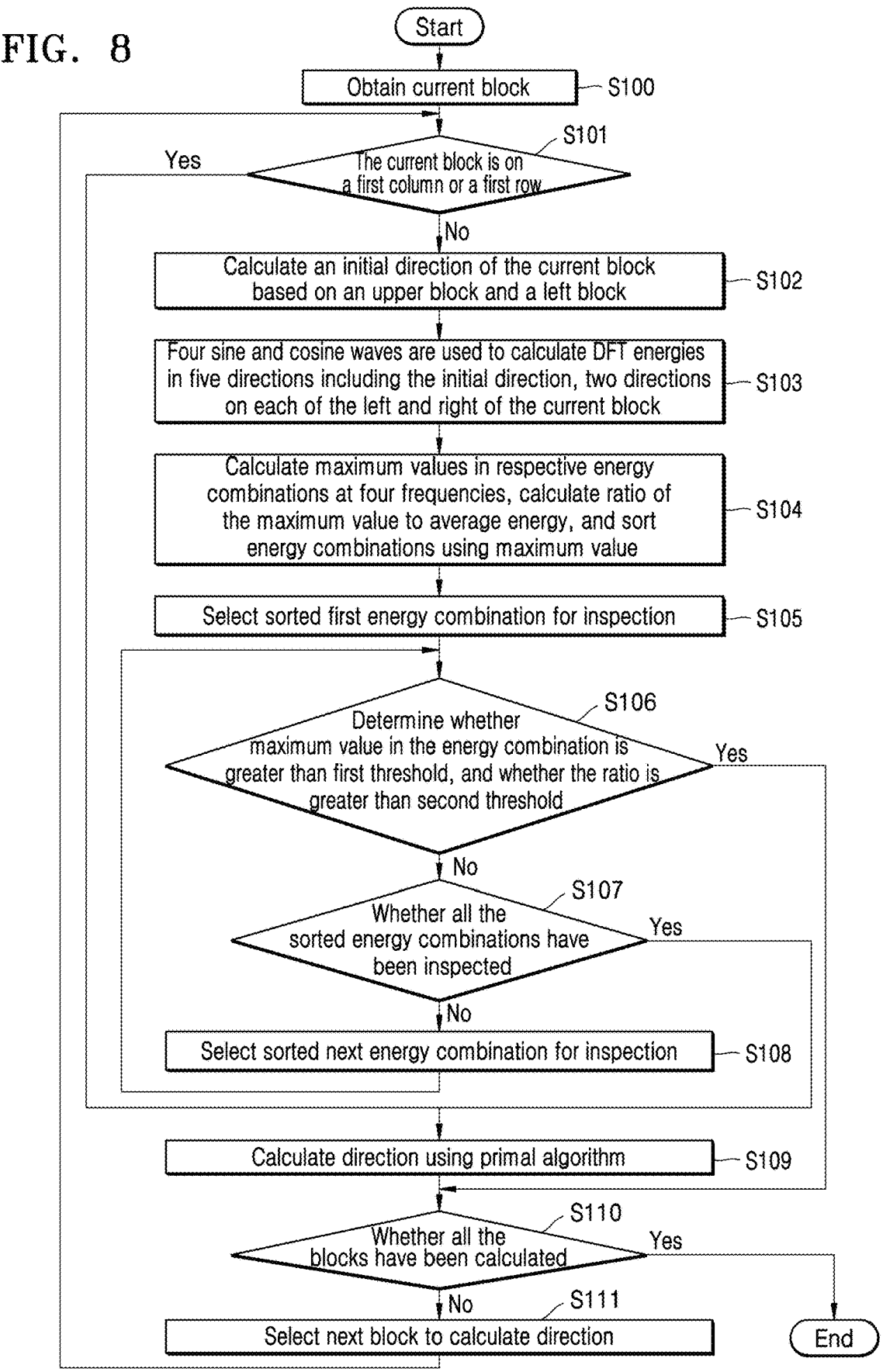
FIG. 8 is a schematic diagram illustrating a systematic procedure of a fingerprint image processing method according to an exemplary embodiment of the present disclosure.

In order to facilitate an understanding of an embodiment, a system explanation is given in conjunction with FIG. 8.

When a fingerprint image is processed, the fingerprint image may be divided into a plurality of blocks, and each block may be processed individually. FIG. 8 shows a systematic procedure of the fingerprint image processing method. As illustrated in FIG. 8, a current block may be obtained at step S100. At step S100, a plurality of blocks of a block matrix representing a fingerprint image may be received. A primal method (such as an NBIS method) may be used to calculate directions of blocks in a first row and a first column. Here, the first row and the first column may be edges of the block matrix. The primal method may enable further processing according to some embodiments of the present disclosure, which may use the directions of a left adjacent block and an upper adjacent block of the current block to calculate a direction of the current block. That is to say, at step S101 of FIG. 8, a determination may be made about whether the current block is on the first column or the first row. If the current block is on the first column or the first row (Yes), a processing may proceed to step S109. If the current block is not on the first column or the first row, a processing may proceed to step S102.

At step S102, an initial direction of the current block is calculated by using the directions of the left block and the upper block of the current block. It is noted that the above aspect describes an example procedure of calculating the initial direction, a repetitive description thereof may be omitted.

At step S103, sine and cosine waves of four frequencies may be used to calculate DFT energies in a plurality of directions. The plurality of directions may include the initial direction, two directions on the left of the current block, and two directions on right of the current block. That is, the plurality of directions may include five directions. At this time, four energy combinations at four frequencies may be obtained, each energy combination may be an array, and each array may contain five elements.

At step S104, a maximum value in each energy combination may be determined (e.g., see FIG. 6) and a ratio of the maximum value to an average energy of a corresponding energy combination may be determined, and the energy combinations may be sorted in descending order by four maximum values.

At step S105, a sorted first energy combination may be selected for inspection.

At step S106, whether a maximum value in the first energy combination is greater than a first threshold, and whether the ratio is greater than a second threshold may be determined. In a case where the maximum value in the first energy combination is greater than the first threshold and the ratio is greater than the second threshold (i.e., "Yes"), a direction corresponding to the maximum value in this energy combination may have a high confidence, the direction may be taken as a final direction of the current block, and processing may proceed to step S110; and in a case where one of the determination results at step S106 is negative (i.e., No), processing may proceed to step S107.

At step S107, it may be determined whether all the sorted energy combinations have been inspected. If all the sorted energy combinations have been inspected, processing may proceed to step 109, and if all the sorted energy combinations have not been inspected, processing may proceed to step 108.

At step S108, a sorted next energy combination may be selected for inspection, and an inspection process may use steps S106 through S108 circularly. It should be understood that if all the energy combinations do not conform to a condition that the maximum value is greater than the first threshold and the ratio is greater than the second threshold, there may be no direction in current five directions associated with a high confidence. In this case, the direction of the current block may be calculated using a current algorithm according to step S109, and a method may proceed to steps S110 and S111 to continue calculation of remaining blocks.

At step S109, the primal method may be used to calculate the direction of the current block.

At step S110, it may be determined whether all the blocks of the fingerprint image have been processed. If all the blocks of the fingerprint image have been processed, a processing may end. If all the blocks of the fingerprint image have not been processed, a processing may proceed to the step S111.

At step S111, the processing of remaining blocks may be continued, that is, a next block may be selected and a direction of the block may be determined.

According to an embodiment, a plurality of adjacent blocks may be selected for inferring an initial direction of a current block, which may increase the accuracy of determination of an initial direction. Improvements in accuracy may be more apparent in an area with relatively large changes in direction. Moreover, a verification may be performed within a small range around the direction of the current block. For example, in an embodiment, five directions (the initial direction and two directions on each of the left and right of the current block) may be verified, and two conditions of the maximum value and the ratio of the maximum value to the average value may be considered during the verification, so that a verification result may be accurately determined. In addition, in a case that the verification fails, a primal method (e.g., an NBIS method) may be used, which may ensure an accuracy of the direction determined for the current block. Since each block of the fingerprint image needs to be inferred, in the case of an error in the calculation of the directions of one or more previous blocks, the error will be accumulated, and may result in increasing errors in the processing of the subsequent blocks. According to an embodiment, consistency may be maintained by using an NBIS algorithm result in certain cases.

Figure 9:
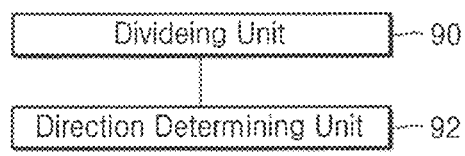
FIG. 9 is a block diagram of a fingerprint image processing device according to an exemplary embodiment of the present disclosure.

According to another aspect of an exemplary embodiment of the present disclosure, a fingerprint image processing device is provided. FIG. 9 is a block diagram of a fingerprint image processing device according to an exemplary embodiment of the present disclosure.

Referring to FIG. 9, the fingerprint image processing device may include a dividing unit 90 and a direction determining unit 92. The dividing unit 90 may be configured to divide a fingerprint image to obtain a block matrix containing at least one block. The direction determining unit 92 may be configured to process each block in the block matrix, except for blocks in a first row or a first column. The direction determining unit 92 may obtain a plurality of candidate directions of a current block, wherein the plurality of candidate directions include an initial direction of the current block, directions of respective predetermined number of blocks on left and right of the current block. The direction determining unit 92 may determine the initial direction based on directions of a left adjacent block and an upper adjacent block of the current block. The direction determining unit 92 may determine a direction of the current block from among the plurality of candidate directions based on Discrete Fourier Transform (DFT) energies in the plurality of candidate directions.

In an embodiment, the direction determining unit 92 may be configured to determine the initial direction of the current block by determining a first direction serial number corresponding to the direction of the left adjacent block and a second direction serial number corresponding to the direction of the upper adjacent block, and determining the initial direction of the current block based on the first direction serial number and the second direction serial number.

In an embodiment, the direction determining unit 92 may be further configured to, in a case where an absolute value of a difference between the first direction serial number and the second direction serial number is less than or equal to a predetermined threshold, obtain an average value of the first direction serial number and the second direction serial number, and take a direction corresponding to the average value as the initial direction of the current block. The direction determining unit 92 may be further configured to, in a case where the absolute value of the difference between the first direction serial number and the second direction serial number is greater than the predetermined threshold, add a small direction serial number and a total direction serial number to obtain an adjusted direction serial number, obtain an average value of the adjusted direction serial number and a large direction serial number, and take a direction corresponding to the average value as the initial direction of the current block, wherein the small direction serial number is a smaller direction serial number in the first direction serial number and the second direction serial number, and the large direction serial number is a larger direction serial number in the first direction serial number and the second direction serial number.

In an embodiment, the direction determining unit 92 may be further configured to, before determining the direction of the current block from among the plurality of candidate directions based on the DFT energies in the plurality of candidate directions, process each of the plurality of candidate directions. A processing of a candidate direction may include performing pixel row addition processing on blocks in a current candidate direction to obtain a pixel sum corresponding to the current candidate direction, performing multiplication on pixel sums corresponding to the plurality of candidate directions and trigonometric functions of a plurality of frequencies to obtain energy combinations respectively corresponding to the plurality of frequencies, and taking the energy combinations respectively corresponding to the plurality of frequencies as the DFT energies.

In an embodiment, the direction determining unit 92 may be further configured to obtain a maximum value in each energy combination and a ratio of the maximum value to an average value of the corresponding energy combination, determine a unique predetermined energy combination among all the energy combinations, wherein the predetermined energy combination satisfies a predetermined condition, and the predetermined condition is that a maximum value of an energy combination is greater than a first threshold and a ratio corresponding to the energy combination is greater than a second threshold, and take a candidate direction corresponding to a maximum value in the predetermined combination as the direction of the current block.

In an embodiment, the direction determining unit 92 may be further configured to obtain a maximum value in each energy combination; sort all the energy combinations in order of maximum value from large to small, and sequentially process the sorted energy combinations. The processing of the sorted energy combinations may include obtaining a ratio of a maximum value of a current energy combination to an average value of the current energy combination, in a case where the current energy combination satisfies a predetermined condition, stopping processing of subsequent energy combinations, and taking a candidate direction corresponding to the maximum value in the current energy combination as the direction of the current block. The predetermined condition may evaluate whether a maximum value of an energy combination is greater than a first threshold and a ratio corresponding to the energy combination is greater than a second threshold. In a case where the maximum value of the current energy combination is less than or equal to the first threshold, processing of subsequent energy combinations may be stopped. In a case where the maximum value of the current energy combination is greater than the first threshold and the ratio corresponding to the current energy combination is less than or equal to the second threshold, processing may continue to a next energy combination.

In an embodiment, in a case where all the energy combinations do not satisfy the predetermined condition, the direction of the current block may be calculated by using an NBIS method.

In an embodiment, the direction determining unit 92 may be configured to, after dividing the fingerprint image to obtain a block matrix containing at least one block, use an NBIS method to calculate a directions of blocks on at least one of a first row or a first column of the block matrix.

It should be understood that each unit/module in the fingerprint image processing method and the fingerprint image processing method device according to an exemplary embodiment of the present disclosure may be implemented as a hardware component and/or a software component. According to the processes executed by each defined unit/module, those skilled in the art can use a field-programmable gate array (FPGA) or an application-specific integrated circuit (ASIC) to implement each unit/module.

According to another aspect of an exemplary embodiment of the present disclosure, there is provided a computer readable storage medium stored therein with a computer program, wherein when the computer program is performed by a processor, the above-described fingerprint image processing method of the present disclosure is implemented.

Specifically, a fingerprint image processing method according to an exemplary embodiment of the present disclosure may be written as a computer program, code segment, instruction, or any combination thereof, and recorded, stored, or fixed in one or more non-transitory computer-readable storage mediums or on one or more non-transitory computer-readable storage mediums. The computer-readable storage medium is any data storage device that can store data read by a computer system. Examples of the computer-readable storage medium include: a read-only memory, a random access memory, read-only optical disks, magnetic tapes, floppy disks, optical data storage devices and a carrier waves (such as a data transmission through the Internet via a wired or wireless transmission path).

According to another aspect of an exemplary embodiment of the present disclosure, there may be provided an electronic apparatus, which may include at least one processor, and at least one memory storing computer executable instructions, wherein the computer executable instructions, when executed by the at least one processor, may cause the at least one processor to execute a fingerprint image processing method according to an embodiment of the present disclosure.

Specifically, the electronic apparatus may broadly be a tablet computer, a smart phone, a smart watch, or any other electronic apparatus that has necessary computing and/or processing capabilities. In an embodiment, the electronic apparatus may include a processor, a memory, a network interface, a communication interface, etc. connected through a system bus. The processor of the electronic apparatus may be used to provide necessary computing, processing and/or controlling capabilities. The memory of the electronic apparatus may include a non-volatile storage medium and an internal memory. An operating system, computer program, etc. may be stored in or on the non-volatile storage medium. The internal memory can provide an environment for the operation of operating systems and the computer program in the non-volatile storage medium. The network interface and communication interface of the electronic apparatus can be used to connect and communicate with external devices through network.

What is claimed is:

1. A fingerprint image processing device, comprising:
a dividing unit configured to divide a fingerprint image to obtain a block matrix containing a plurality of blocks; and
a direction determining unit configured to process each block in the block matrix, except a first row and a first column, by: obtaining a plurality of candidate directions of a current block, wherein the plurality of candidate directions comprise an initial direction of the current block, and directions of respective predetermined number of blocks on left and right of the current block, and the initial direction is determined based on directions of a left adjacent block and an upper adjacent block of the current block; and determining a direction of the current block from among the plurality of candidate directions based on Discrete Fourier Transform (DFT) energies in the plurality of candidate directions.

2. The fingerprint image processing device of claim 1, further comprising:
a processor; and
a computer readable storage medium stored therein with a computer program, wherein when the computer program is performed by the processor, implements a method of the direction determining unit.

3. A fingerprint image processing method, comprising:
dividing a fingerprint image to obtain a block matrix including a plurality of blocks; and
for each block in the block matrix, except a first row and a first column, performing following processing:
obtaining a plurality of candidate directions of a current block, wherein the plurality of candidate directions comprise an initial direction of the current block, and directions of respective predetermined number of blocks on a left of the current block and a right of the current block, and the initial direction is determined based on a direction of a left adjacent block of the current block and a direction of an upper adjacent block of the current block; and
determining a direction of the current block from among the plurality of candidate directions using Discrete Fourier Transform (DFT) energies in the plurality of candidate directions.

4. The fingerprint image processing method of claim 3, further comprising determining the initial direction of the current block, wherein determining the initial direction of the current block comprises:
- determining a first direction serial number corresponding to the direction of the left adjacent block and a second direction serial number corresponding to the direction of the upper adjacent block; and
- determining the initial direction of the current block using the first direction serial number and the second direction serial number.

5. The fingerprint image processing method of claim 4, wherein the determining the initial direction of the current block using the first direction serial number and the second direction serial number comprises:
- in a case where an absolute value of a difference between the first direction serial number and the second direction serial number is less than or equal to a predetermined threshold, obtaining a first average value of the first direction serial number and the second direction serial number, and taking a direction corresponding to the first average value as the initial direction of the current block; and
- in a case where the absolute value of the difference between the first direction serial number and the second direction serial number is greater than the predetermined threshold, adding a small direction serial number and a total direction serial number to obtain an adjusted direction serial number, obtaining a second average value of the adjusted direction serial number and a large direction serial number, and taking a direction corresponding to the second average value as the initial direction of the current block, wherein the small direction serial number is a smaller direction serial number in the first direction serial number and the second direction serial number, and the large direction serial number is a larger direction serial number in the first direction serial number and the second direction serial number.

6. The fingerprint image processing method of claim 4, further comprising processing each of the plurality of candidate directions before the determining the direction of the current block from among the plurality of candidate directions using the DFT energies in the plurality of candidate directions, wherein processing each of the plurality of candidate directions comprises:
- performing pixel row addition processing on blocks in a current candidate direction to obtain a pixel sum corresponding to the current candidate direction;
- performing multiplication on pixel sums corresponding to the plurality of candidate directions and trigonometric functions of a plurality of frequencies to obtain energy combinations respectively corresponding to the plurality of frequencies; and
- taking the energy combinations respectively corresponding to the plurality of frequencies as the DFT energies.

7. The fingerprint image processing method of claim 6, wherein the determining the direction of the current block from among the plurality of candidate directions based on the DFT energies in the plurality of candidate directions comprises:
- obtaining a maximum value in each energy combination and a ratio of the maximum value to an average value of the corresponding energy combination;
- determining a unique predetermined energy combination among all the energy combinations, wherein the predetermined energy combination satisfies a predetermined condition, and the predetermined condition evaluates that a maximum value of an energy combination is greater than a first threshold and a ratio corresponding to the energy combination is greater than a second threshold; and
- taking a candidate direction corresponding to a maximum value in the predetermined combination as the direction of the current block.

8. The fingerprint image processing method of claim 7, further comprising:
- in a case where the energy combinations do not satisfy the predetermined condition, calculating the direction of the current block by using a primal method.

9. The fingerprint image processing method of claim 6, wherein the determining the direction of the current block from among the plurality of candidate directions based on the DFT energies in the plurality of candidate directions comprises:
- obtaining a maximum value of each energy combination;
- sorting the energy combinations in order of maximum value from large to small; and
- processing, sequentially, the sorted energy combinations, wherein processing the sorted energy combinations comprises:
  - obtaining a ratio of a maximum value of a current energy combination to an average value of the current energy combination;
  - in a case where the current energy combination satisfies a predetermined condition, stopping processing subsequent energy combinations, and taking a candidate direction corresponding to the maximum value of the current energy combination as the direction of the current block, wherein the predetermined condition evaluates that a maximum value of an energy combination is greater than a first threshold and a ratio corresponding to the energy combination is greater than a second threshold;
  - in a case where the maximum value of the current energy combination is less than or equal to the first threshold, stopping the processing of the sorted energy combinations; and
  - in a case where the maximum value of the current energy combination is greater than the first threshold and the ratio corresponding to the current energy combination is less than the second threshold, continuing to process a next energy combination in the sorted energy combinations.

10. The fingerprint image processing method of claim 9, further comprising:
- in a case where the energy combinations do not satisfy the predetermined condition, calculating the direction of the current block by using a primal method.

11. The fingerprint image processing method of claim 4, after dividing the fingerprint image to obtain the block matrix including the plurality of blocks, further comprising:
- using a primal method to calculate directions of blocks in the first row and the first column of the block matrix.

12. A fingerprint image processing method, comprising:
- receiving a plurality of blocks of a block matrix representing a fingerprint image; and
- processing a first set of blocks of the plurality of blocks, the processing comprising:
  - obtaining a plurality of candidate directions of a current block, wherein the plurality of candidate directions comprise an initial direction of the current block, and directions of at least a respective predetermined number of blocks on a left of the current block and a right of the current block, and the initial direction is determined using a direction of a left adjacent block of the current block and a direction of an upper adjacent block of the current block; and determining a direction of the current block from among the plurality of candidate directions using Discrete Fourier Transform (DFT) energies in the plurality of candidate directions.

13. The fingerprint image processing method of claim 12, further comprising determining the initial direction of the current block, wherein determining the initial direction of the current block comprises:

determining a first direction serial number corresponding to the direction of the left adjacent block and a second direction serial number corresponding to the direction of the upper adjacent block; and determining the initial direction of the current block using the first direction serial number and the second direction serial number.

14. The fingerprint image processing method of claim 13, wherein the determining the initial direction of the current block using the first direction serial number and the second direction serial number comprises:

in a case where an absolute value of a difference between the first direction serial number and the second direction serial number is less than or equal to a predetermined threshold, obtaining a first average value of the first direction serial number and the second direction serial number, and taking a direction corresponding to the first average value as the initial direction of the current block; and in a case where the absolute value of the difference between the first direction serial number and the second direction serial number is greater than the predetermined threshold, adding a small direction serial number and a total direction serial number to obtain an adjusted direction serial number, obtaining a second average value of the adjusted direction serial number and a large direction serial number, and taking a direction corresponding to the second average value as the initial direction of the current block, wherein the small direction serial number is a smaller direction serial number in the first direction serial number and the second direction serial number, and the large direction serial number is a larger direction serial number in the first direction serial number and the second direction serial number.

15. The fingerprint image processing method of claim 12, further comprising processing each of the plurality of candidate directions before the determining the direction of the current block from among the plurality of candidate directions using the DFT energies in the plurality of candidate directions, wherein processing each of the plurality of candidate directions comprises:

performing pixel row addition processing on blocks in a current candidate direction to obtain a pixel sum corresponding to the current candidate direction;

performing multiplication on pixel sums corresponding to the plurality of candidate directions and trigonometric functions of a plurality of frequencies to obtain energy combinations respectively corresponding to the plurality of frequencies; and taking the energy combinations respectively corresponding to the plurality of frequencies as the DFT energies.

16. The fingerprint image processing method of claim 15, wherein the determining the direction of the current block from among the plurality of candidate directions based on the DFT energies in the plurality of candidate directions comprises:

obtaining a maximum value in each energy combination and a ratio of the maximum value to an average value of the corresponding energy combination;

determining a unique predetermined energy combination among all the energy combinations, wherein the predetermined energy combination satisfies a predetermined condition, and the predetermined condition evaluates that a maximum value of an energy combination is greater than a first threshold and a ratio corresponding to the energy combination is greater than a second threshold; and taking a candidate direction corresponding to a maximum value in the predetermined combination as the direction of the current block.

17. The fingerprint image processing method of claim 16, further comprising:

in a case where the energy combinations do not satisfy the predetermined condition, calculating the direction of the current block by using a primal method.

18. The fingerprint image processing method of claim 15, wherein the determining the direction of the current block from among the plurality of candidate directions based on the DFT energies in the plurality of candidate directions comprises:

obtaining a maximum value of each energy combination;

sorting the energy combinations in order of maximum value from large to small; and processing, sequentially, the sorted energy combinations, wherein processing the sorted energy combinations comprises:

obtaining a ratio of a maximum value of a current energy combination to an average value of the current energy combination;

in a case where the current energy combination satisfies a predetermined condition, stopping processing subsequent energy combinations, and taking a candidate direction corresponding to the maximum value of the current energy combination as the direction of the current block, wherein the predetermined condition evaluates that a maximum value of an energy combination is greater than a first threshold and a ratio corresponding to the energy combination is greater than a second threshold;

in a case where the maximum value of the current energy combination is less than or equal to the first threshold, stopping the processing of the sorted energy combinations; and in a case where the maximum value of the current energy combination is greater than the first threshold and the ratio corresponding to the current energy combination is less than the second threshold, continuing to process a next energy combination in the sorted energy combinations.

19. The fingerprint image processing method of claim 18, further comprising:

in a case where the energy combinations do not satisfy the predetermined condition, calculating the direction of the current block by using a primal method.

20. The fingerprint image processing method of claim 12, further comprising processing a second set of blocks of the plurality of blocks using a primal method to calculate directions of the second set of blocks, wherein the second set of blocks are disposed in at least one of an edge row or an edge column of the block matrix.

* * * * *